(12) United States Patent
McKenna et al.

(10) Patent No.: US 9,641,398 B1
(45) Date of Patent: *May 2, 2017

(54) BLOOM FILTER INDEX FOR DEVICE DISCOVERY

(71) Applicant: International Business Machines Corporation, Armonk, NY (US)

(72) Inventors: Patrick J. McKenna, Galway (IE); David P. O'Connor, Galway (IE); Claude N. Warren, Jr., Galway (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/276,906

(22) Filed: Sep. 27, 2016

Related U.S. Application Data

(63) Continuation of application No. 15/059,599, filed on Mar. 3, 2016, which is a continuation of application No. 14/921,427, filed on Oct. 23, 2015.

(51) Int. Cl.
*G06F 17/30* (2006.01)
*H04L 12/24* (2006.01)
*G06F 3/06* (2006.01)

(52) U.S. Cl.
CPC ............ *H04L 41/12* (2013.01); *G06F 3/0604* (2013.01); *G06F 3/067* (2013.01); *G06F 3/0631* (2013.01); *G06F 17/30324* (2013.01); *G06F 17/30327* (2013.01)

(58) Field of Classification Search
CPC ... H04L 43/12; G06F 17/30867; G06F 3/067; G06F 3/0631; G06G 3/0604
See application file for complete search history.

(56) References Cited

U.S. PATENT DOCUMENTS

| | | | |
|---|---|---|---|
| 7,415,472 | B2 | 8/2008 | Testa |
| 8,199,652 | B2 | 6/2012 | Lim |
| 8,429,198 | B1 | 4/2013 | Sim-Tang |
| 8,484,438 | B2 | 7/2013 | Cypher |
| 8,498,995 | B1 | 7/2013 | Gond et al. |

(Continued)

OTHER PUBLICATIONS

Goh, "Secure Index", Cryptology ePrint Archive: Report Oct. 7, 2003, pp. 1-18.

(Continued)

*Primary Examiner* — Oanh Duong
(74) *Attorney, Agent, or Firm* — David Zwick

(57) ABSTRACT

Identifying network devices having specified traits using a multi-level hierarchical data structure. Bloom filters representing traits of network devices are received and their bit vectors are decomposed into successive bytes. For each byte except the last one, memory for storing a pointer to memory on the next level is allocated on the level corresponding to the byte. The pointer storage is labeled by the value of the next byte. A pointer to the allocated memory is stored in the pointer storage on the previous level that was labeled by the value of the current byte. For the last byte, memory for storing references to network devices is allocated on the last level. A pointer to the allocated memory is stored in the pointer storage on the second-to-last level that was labeled by the value of the last byte. A reference to the network device is stored in the allocated memory.

1 Claim, 9 Drawing Sheets

(56) References Cited

U.S. PATENT DOCUMENTS

| | | | |
|---|---|---|---|
| 8,630,294 | B1 | 1/2014 | Keen et al. |
| 8,756,238 | B2 | 6/2014 | Xie |
| 2003/0026268 | A1 | 2/2003 | Navas |
| 2010/0318795 | A1 | 12/2010 | Haddad et al. |
| 2013/0212296 | A1 | 8/2013 | Goel et al. |
| 2013/0227051 | A1 | 8/2013 | Khakpour et al. |
| 2014/0040317 | A1 | 2/2014 | Valenza et al. |
| 2014/0074819 | A1 | 3/2014 | Dicula et al. |
| 2014/0108435 | A1 | 4/2014 | Kolesnikov |
| 2014/0198724 | A1 | 7/2014 | Abraham et al. |
| 2014/0254513 | A1 | 9/2014 | Abraham et al. |
| 2015/0293937 | A1 | 10/2015 | Zhang et al. |
| 2016/0112254 | A1 | 4/2016 | Levy-Abegnoli et al. |
| 2016/0112367 | A1* | 4/2016 | Thubert .............. H04L 61/2092 370/254 |
| 2016/0179893 | A1 | 6/2016 | He |

OTHER PUBLICATIONS

Sakuma et al., "Evaluation of the Structured Bloom Filters Based on Similarity", 2011 International Conference on Advanced Information Networking and Application, IEEE, pp. 316-323.

Crainiceanu, "Bloofi: Multidimensional Bloom Filters", Information Systems, vol. 54, (2015), pp. 311-324.

Athanassoulis et al., "BF-Tree: Approximate Tree Indexing," Proceedings of the VLDB Endowment, Sep. 1-5, 2014, vol. 7, No. 14, pp. 1881-1892.

Sato et al., "Bloom Filters Based on the B-tree," International Conference on Complex, Intelligent and Software Intensive Systems, 2009, IEEE, pp. 500-505.

Luo et al., "Designing a New Bloom Filter-based Index for Distributed Data Management," Journal of Computational Information Systems, vol. 10, No. 2, 2014, pp. 727-737.

Crainiceanu, "Bloofi: A Hierarchical Bloom Filter Index with Applications to Distributed Data Provenance," Cloud-I '13, Proceedings of the 2nd International Workshop on Cloud Intelligence, 2013, Article No. 4, pp. 1-8.

Bloom, "Space/Time Trade-offs in Hash Coding with Allowable Errors," Communications of the ACM, vol. 13, No. 7, Jul. 1970, pp. 422-426.

Mell et al., "The NIST Definition of Cloud Computing", National Institute of Standards and Technology, Special Publication 800-145, Sep. 2011, pp. 1-7.

Mitzenmacher et al., "Probability and Computing: Randomized Algorithms and Probabilistic Analysis", ACM SIGACT News, Sep. 2007, vol. 38, No. 3, pp. 22-27.

IBM, List of IBM Patents or Patent Applications Treated as Related, Appendix P, dated Dec. 5, 2016, 2 pages.

Pending U.S. Appl. No. 15/279,881, filed Sep. 29, 2016, Entitled: "A Bloom Filter Index for Device Discovery".

Pending U.S. Appl. No. 14/921,427, filed Oct. 23, 2015, Entitled: "A Bloom Filter Index for Device Discovery".

Pending U.S. Appl. No. 15/059,599, filed Mar. 3, 2016, Entitled: "A Bloom Filter Index for Device Discovery".

Crainiceanu, "Bloofi: Multidimensional Bloom Filters", Information Systems, vol. 54, (2015), pp. 311-324, Elsevier Ltd.

IBM, List of IBM Patents or Patent Applications Treated as Related, Appendix P, dated Oct. 5, 2016, 2 pages.

* cited by examiner

EXAMPLE: SEARCH B-TREE FOR DEVICES WITH BLOOM FILTERS MATCHING "A37"

BLOOM FILTER INDEX FOR DEVICE DISCOVERY

BACKGROUND

The present invention relates generally to a data structure that may be used in network communications, and more particularly to an index for locating, or discovering, devices connected within a network.

Network discovery is a technique commonly used by gateway servers and network management servers to identify devices in a network with given characteristics, or traits, as a component of monitoring a network. Network devices generally refers to routers and switches, but may also include other networked devices, such as printers.

A Bloom filter is a memory-efficient, probabilistic data structure that supports approximate membership queries. When testing whether an object is a member of a set represented by a Bloom filter, a query may return "definitely not in set" or "may be in set," with a small probability of false positives. A Bloom filter is typically implemented as a bit array into which a set of values, representing set elements, is hashed. In general, a Bloom filter may be considered when space is at a premium and the effect of false positives can be mitigated. Due to their efficiency, compact representation, and flexibility in allowing a trade-off between memory requirements and false positive probability, Bloom filters are popular in representing diverse sets of data. For example, they are used in databases, distributed systems, web caching, and other network applications, where systems need to share information about what resources they have.

A Bloom filter index organizes a collection of Bloom filters. Searching a Bloom filter index for a target Bloom filter typically involves comparing indexed Bloom filters with the target Bloom filter to find matches. Due to the pattern matching nature of the search, conventional indexes may be ineffective in locating indexed Bloom filters. A standard technique for locating Bloom filters in a collection of Bloom filters is to linearly search a list of Bloom filters. It would be advantageous to have an efficient, faster than linear, mechanism for indexing Bloom filters.

SUMMARY

Embodiments of the present invention disclose a computer-implemented method, computer program product, and system for identifying network devices having specified traits using a multi-level hierarchical data structure. One or more Bloom filters representing network devices, where each Bloom filter has a bit vector with a number b of 8-bit bytes representing traits of a network device, are received. For each Bloom filter, the bit vector is decomposed into b successive bytes, where each successive byte corresponds to a level below level 0 in the data structure. On level 0, memory that includes storage for a pointer to a memory location on level 1 is allocated and the pointer storage is assigned a label that is based on the value of the first byte. For each successive byte, except for the last byte, memory on the level corresponding to the successive byte is allocated. The memory includes storage for a pointer to a memory location on the next level. The pointer storage is assigned a label that is based on the value of the next successive byte. A pointer to the allocated memory is stored in the pointer storage on the previous level that was assigned a label based on the value of the current byte. For the last byte, memory is allocated on the last level of the data structure. The memory includes data storage for storing a reference to the network device. A pointer to the allocated memory is stored in the pointer storage on the second-to-last level that was assigned a label based on the value of the last byte. A reference to the network device is stored in the data storage on the last level of the data structure. A search Bloom filter, having a bit vector of b bytes representing specified traits of a network device, is received. The search Bloom filter's bit vector is decomposed into b successive bytes. Each of the bytes corresponds to a level below level 0 in the data structure. For each byte, memory locations on the level corresponding to the byte, which are referenced by pointers stored on the previous level, whose assigned labels are based on the value of a byte having a 1 bit wherever the current byte has a 1 bit, are identified. For the last byte, references to network devices, stored in the identified memory locations on the last level, are identified. The referenced network devices correspond to the traits specified in the search Bloom filter.

In a further aspect of the invention, a search Bloom filter with a bit vector of the predefined length is received. The Bloom filter's bit vector is decomposed into successive bit sequences in the predefined pattern. Each of the bit sequences corresponds to a level below level 0 in the data structure. For each bit sequence, memory locations on the level corresponding to the bit sequence, that are referenced by pointers stored on the previous level, whose assigned labels are based on the binary value of a bit sequence having a 1 bit wherever the current bit sequence has a 1 bit, are identified. For the last bit sequence, Bloom filters and/or associated data, stored in the identified memory locations on the last level, are further identified.

DETAILED DESCRIPTION

Embodiments of the present invention are directed to network discovery systems that efficiently locate networked devices having specified traits through the use of Bloom filters and Bloom filter indexes.

Network discovery is generally performed by a network discovery tool, which searches a network for devices having specified traits as part of the network management function. For example, the traits might include IP address, manufacturer, device type, system capabilities, OS version, command port, etc. Various protocols, including the IEEE Standard 802.1AB-2009, Link Layer Discovery Protocol (LLDP), and various proprietary protocols, such as the Cisco® Discovery Protocol and Microsoft's® Link Layer Topology Discovery specify how network devices may advertise their identity, capabilities, and neighbors in a computer network. For example, in an LLDP-enabled network, LLDP agents on network devices send information at a fixed interval as an Ethernet frame. Devices maintain the information in a database that can be queried using the Simple Network Management Protocol. The topology of an LLDP-enabled network can be discovered by crawling the devices and querying this database. With current technology, network discovery can be very slow, depending on the size of the network.

Figure 1:
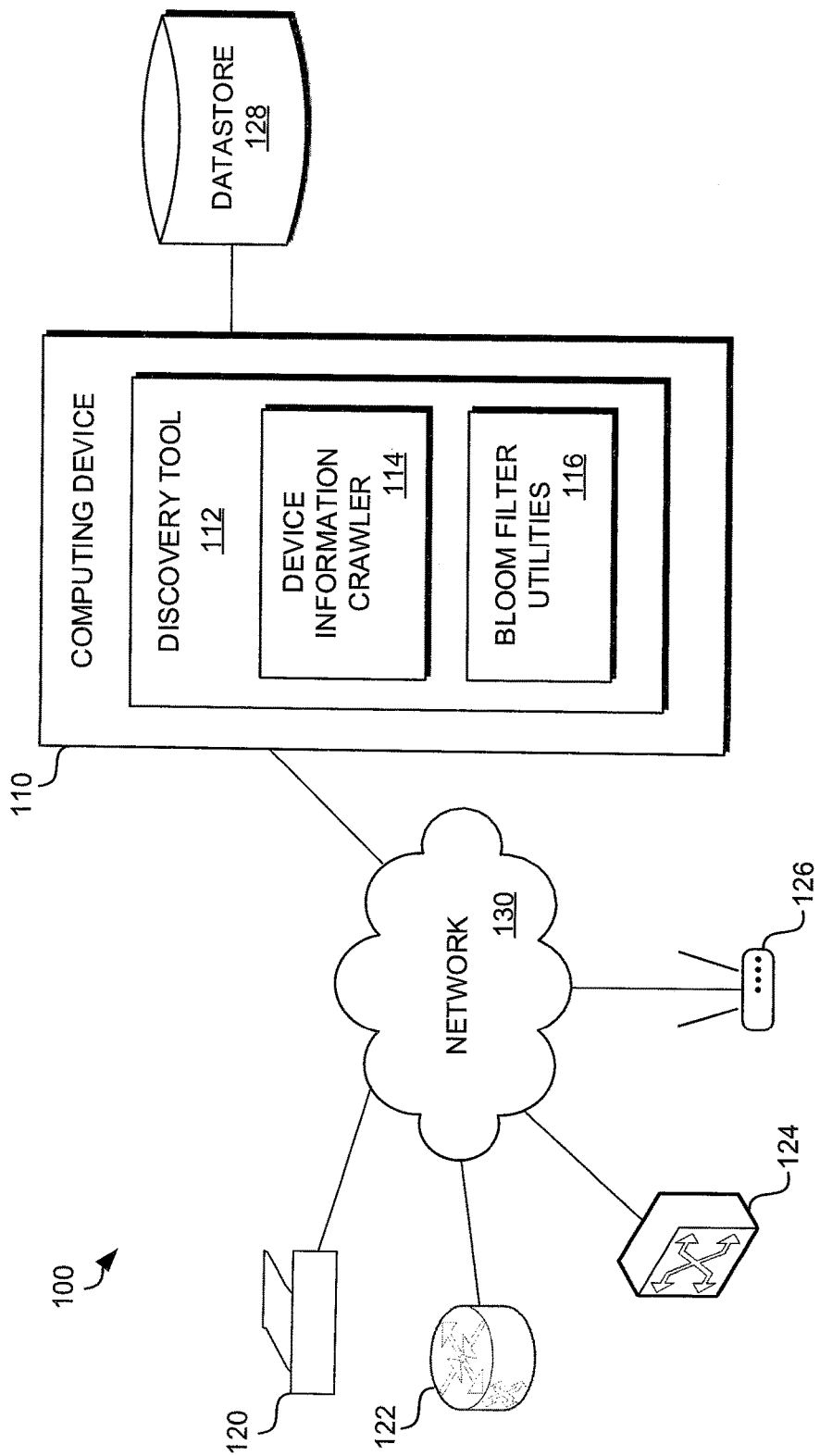
FIG. 1 is a functional block diagram of a network discovery system, in accordance with an embodiment of the present invention.

FIG. 1 is a functional block diagram of a network discovery system 100, in accordance with an embodiment of the present invention. Network discovery system 100 includes computing device 110, network routers 122, network switches 124, wireless routers 126, and printers 120, all interconnected over a network 130.

Network routers 122 and network switches 124 are computer networking devices that allow one or more computers, such as computing device 110, to be connected to other computers, network devices, or to other networks, in accordance with an embodiment of the invention. Wireless routers 126 connect computing devices and mobile devices (not shown) via Wi-Fi. In various embodiments, other types of devices may also be connected to network 130, such as hubs, modems, scanners, plotters, etc.

Network 130 can be, for example, a local area network (LAN), a wide area network (WAN) such as the Internet, or a combination of the two, and can include wired, wireless, or fiber optic connections. In general, network 130 can be any combination of connections and protocols that will support communications between computing device 110 and network devices 120, 122, 124, and 126, in accordance with embodiments of the present invention.

Computing device 110 represents the computing environment or platform that hosts network discovery tool 112. In various embodiments, computing device 110 may be a laptop computer, netbook computer, personal computer (PC), a desktop computer, or any programmable electronic device capable of hosting network discovery tool 112, described below, and communicating with network devices 120, 122, 124, and 126 via network 130, in accordance with embodiments of the invention. Computing device 110 may include internal and external hardware components, as depicted and described in further detail below with reference to FIG. 7, below. In other embodiments, computing device 110 may be implemented in a cloud computing environment, as described in relation to FIGS. 8 and 9, below.

In an embodiment of the invention, computing device 110 includes network discovery tool 112 and datastore 128. Network discovery tool 112 may further include device information crawler 114, and Bloom filter utilities 116.

Network discovery tool 112 operates generally to crawl network 130 to collect information characterizing network devices, or device traits, for network devices such as devices 120, 122, 124, and 126, create for each device a Bloom filter representing the device via its traits, and store a reference to the device in a Bloom filter index in datastore 128, in accordance with an embodiment of the invention. Network discovery tool 112 may also receive a request to identify devices in the network having certain traits. This request is processed by Bloom filter utilities 116.

Device information crawler 114 periodically scans network 130, based, for example, on a predefined scan interval, and collects device traits from devices on the network, such as network routers 122, network switches 124, wireless routers 126, and printers 120, in accordance with an embodiment of the invention. The device traits collected from each device may include an IP address, manufacturer, device type, device capabilities (e.g., number of ports and port speed), OS version, command port, etc. Device information crawler 114 may employ for this purpose a discovery protocol such as LLDP. Device information crawler 114 may store device information in datastore 128.

Figure 9:
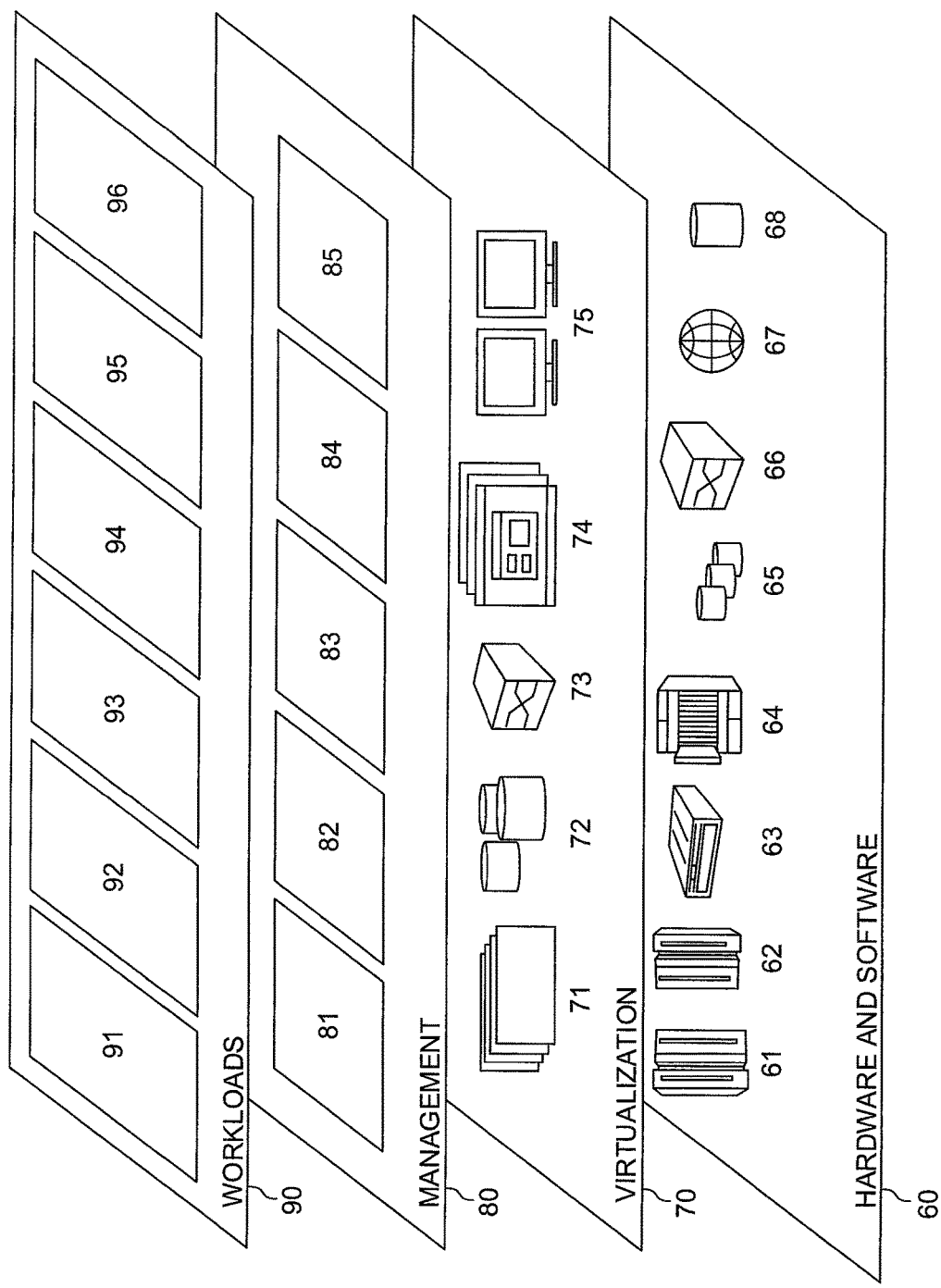
FIG. 9 depicts abstraction model layers according to an embodiment of the present invention.

Datastore 128 represents a store of device information crawled from network 130 by device information crawler 114. Datastore 128 may also hold a Bloom filter index maintained by Bloom filter utilities 116, as described below. Datastore 128 may reside, for example, on computer readable storage media 908 (FIG. 7) or storage devices 65 (FIG. 9).

Bloom filter utilities 116 operate generally to receive device traits for network devices from datastore 128 and store references to the network devices in a Bloom filter index in datastore 128, in accordance with an embodiment of the invention. Bloom filter utilities 116 also operate to receive requests to identify network devices having specified traits and identify, to a high degree of probability, network devices having the specified traits, based on information in the Bloom filter index.

In an exemplary embodiment of the invention, network devices are characterized by traits such as device type, number of ports, and port speed. As part of a network management system, Bloom filter utilities 116 may create Bloom filters based on the network device traits crawled from network 130 and stored in datastore 128 by device information crawler 114, and may maintain an index of the network devices in a Bloom filter index for efficient retrieval. In response to receiving a request for a list of network devices that match a specified set of device traits, Bloom filter utilities 116 may generate a target Bloom filter from these device traits and may search the Bloom filter index to identify network devices that match the target Bloom filter.

Bloom filter utilities 116 creates a Bloom filter for each network device, based on a predetermined set of device characteristics. For example, if each network device is characterized by the device traits device type, number of ports, and port speed, network switch 124 might be characterized by the device trait set (switch, 48, 1000 Mbs). Elements in the device trait set representing a network device may be, for example, for example, alphabetic, numeric, or alphanumeric strings, or Boolean values, such as 0/1 or Yes/No, indicating the presence or absence of a device trait in the set of device traits.

A Bloom filter for a set of n elements, e.g., the three example device traits described above, uses an array, or bit vector, of m bits, and a collection of k hash functions, for a concise representation. The choice of m and k will depend on the number of traits and an acceptable false positive probability, as described below. The size of a Bloom filter is the length m of its bit vector. The k hash functions independently map each of the elements of the set of device traits to positions in the bit array, for example, 1, . . . , m. Initially, a Bloom filter has all m bits set to 0. To add an element of the set to the Bloom filter, each of the k hash functions maps the element to some array position, and the bit in that position is set to 1. After each of the k hash functions has mapped each of the n elements, or traits, to one of the m bit positions in the Bloom filter array representing the traits of the network device, to check whether the mapped device has a particular device trait, the k hash functions are applied to the trait. If any of the resulting k positions in the device's Bloom filter array contain a 0, the trait is definitely not present. If all k positions contain a 1, the network device might have the trait, i.e., the 1 might represent a true positive or a false positive. A false positive may occur if all bits related to a given trait have been set to 1 by other traits. There is a trade-off between the size of a Bloom filter and the probability of false positives returned by it. The probability of false positives can be lowered by increasing the size of the Bloom filters used.

A Bloom filter is characterized by the number of elements n in the set it represents, the number k of hash functions used, the length m of its bit vector, and the probability p of false positives. The relationship between these properties is closely approximated by equation (1):

$$p = \left(1 - e^{-\frac{kn}{m}}\right)^k \quad (1)$$

From this equation it is possible to construct a Bloom filter with desired properties, for example, by adjusting m and k to give an acceptable probability p of false positives. For example, equation (1) implies that a Bloom filter representing a network device characterized by a set of n=3 traits, with a false positive probability of around 1 in 100,000, may be constructed using a bit vector with m=72 bits and k=17 hash functions. A Bloom filter corresponding to a network device is created by applying each of the 17 hash functions to the three device traits and setting the appropriate bits in the Bloom filter's bit vector to 1. All Bloom filters representing the network devices will have the same size and share the same set of hash functions.

As described above, each network device is mapped by Bloom filter utilities 116 to a Bloom filter. However, it is possible that more than one network device can be mapped to the same Bloom filter. This may occur, for example, if two network devices are characterized by the same set of device traits.

In embodiments of the present invention, Bloom filter utilities 116 maintains a Bloom filter index for use in network discovery in the form of a B-tree. A B-tree is a multiway tree data structure, having a root, interior nodes, and leaf nodes, that organizes data and generally allows searches, sequential access, insertions, and deletions in logarithmic time. In the B-tree Bloom filter index, a Bloom filter representing the device traits of an individual network device determines a unique path in the tree, terminating in a leaf node, where a reference to the device is stored. Each leaf node corresponds to a unique Bloom filter representing one or more indexed network devices.

Figure 2:
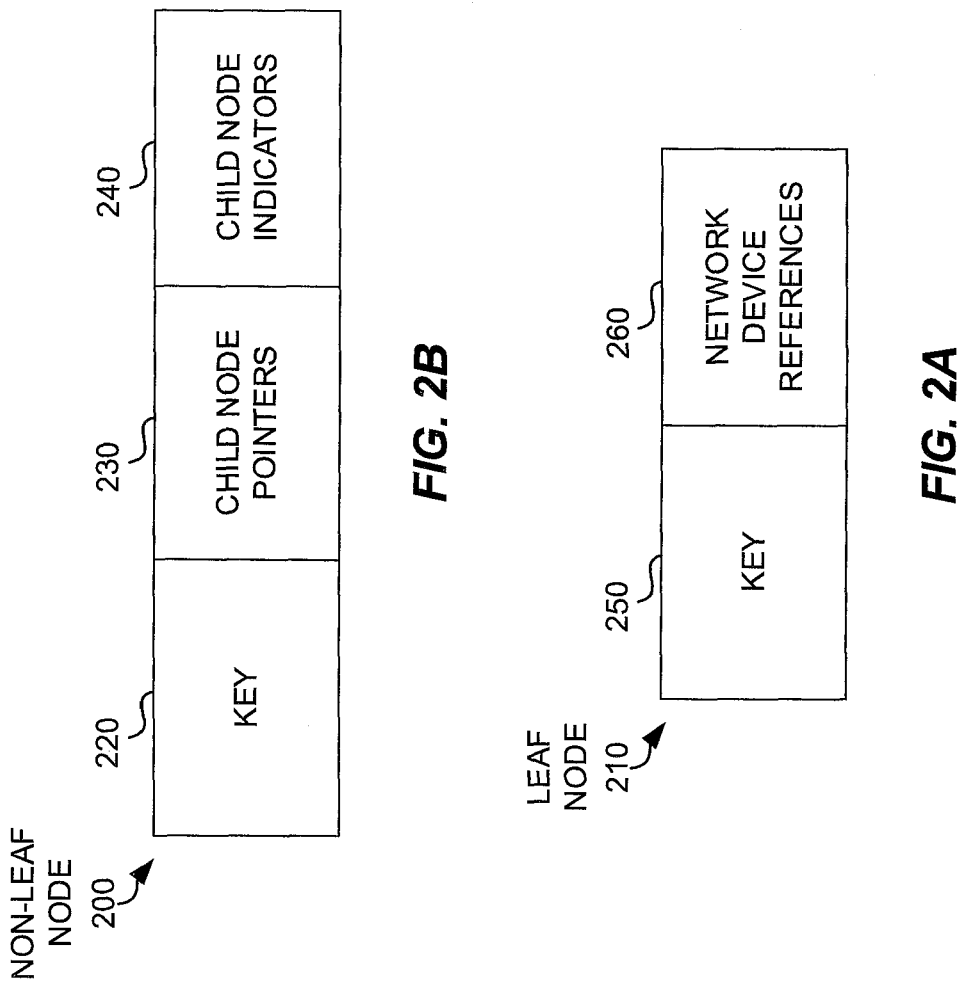
FIG. 2A illustrates how a leaf node of a B-tree may be represented in memory, in accordance with an embodiment of the present invention.
FIG. 2B illustrates how a non-leaf node of a B-tree may be represented in memory, in accordance with an embodiment of the present invention.

FIG. 2A illustrates how a B-tree leaf node 210 in a Bloom filter index may be represented in memory, in accordance with various embodiments of the present invention. Leaf node 210 includes a key field 250, which stores a key, and a network device references field 260. The key field 250 corresponds to a particular Bloom filter array and may contain as key the bit vector, for example, as a numerical value or character string. B-tree leaf node 210 also includes a network device references field 260, which stores a list of the network devices in the Bloom filter index that are represented by the Bloom filter corresponding to the key field 250.

FIG. 2B illustrates how a B-tree non-leaf node 200 in a Bloom filter index may be represented in memory, in accordance with various embodiments of the present invention. A non-leaf node is either the root or an interior node of the B-tree. B-tree non-leaf node 200 includes a key field 220, a child node pointers field 230, and a child node indicators field 240. The key field 220 identifies a node via a subsequence of the bits in a Bloom filter array corresponding to an indexed network device, as described with reference to FIG. 3, below. Child node pointers field 230 contains pointers to child nodes that have been added or populated in inserting Bloom filters in the B-tree. Child node indicators field 240 indicates which child nodes are present or, if pre-allocated, populated. For example, if each non-leaf node 200 may have 16 child nodes, labeled 0-15, then child node indicators field 240 may be a bit vector of length 16, such that a 1 in a particular bit location signals that a pointer to the corresponding child node will be stored in child node pointers field 230. This is described in more detail with reference to FIG. 3, below.

In various embodiments, a B-tree may be implemented in memory as a collection of linked lists of non-leaf nodes 200 and leaf nodes 210. The root node on hierarchical level 0 is a non-leaf node 200 that links via its child node pointers field 230 to a set of child nodes on hierarchical level 1, which may also be non-leaf nodes 200. Each non-leaf node may link to further non-leaf nodes 200, or it may link to a set of leaf nodes 210. All of the leaf nodes 210 are on the same hierarchical level in the B-tree; that is, the number of links that need to be followed starting from the root is the same for all leaf nodes 210.

In various embodiments of the invention, child node pointer field 230 is in contiguous memory and child nodes referenced in the list are accessed by applying an offset, derived from the key field 220 or 250 of a child node, to a base address.

In various embodiments of the invention, memory for the B-tree is allocated prior to inserting any Bloom filters. For example, if each non-leaf node 200 may have 256 child nodes, then a non-leaf node 200 for the root, with space for 256 child node pointers and 256 corresponding non-leaf child nodes, may be pre-allocated. This process is repeated for each of the non-leaf nodes 200 on subsequent hierarchical levels. For each non-leaf node on the next-to-last hierarchical level, 256 pointers to leaf nodes 210 are allocated and the 256 corresponding leaf nodes are allocated. As Bloom filters are inserted in the B-tree, key fields 220 and 250, child node pointers fields 230, and child node indicators fields 240 in the pre-allocated non-leaf nodes 200 and leaf nodes 210 are updated, and references to network devices are added to the pre-allocated leaf nodes 210.

In other embodiments, memory for nodes is allocated only when needed in inserting Bloom filters in the B-tree. In this case, if child node indicators field 240 indicates that a particular node has already been allocated, based on a previously processed Bloom filter, then it is not allocated again.

In an illustrative example, Bloom filters representing network devices are inserted into a Bloom filter index implemented as a B-tree by deconstructing their bit vectors into successive 4-bit nibbles and using nibble sequences as keys in the B-tree. In various embodiments of the invention, 4-bit nibbles, 8-bit bytes, or other-sized portions of a bit vector may be used for the keys, as will be appreciated by those skilled in the art.

Figure 3:
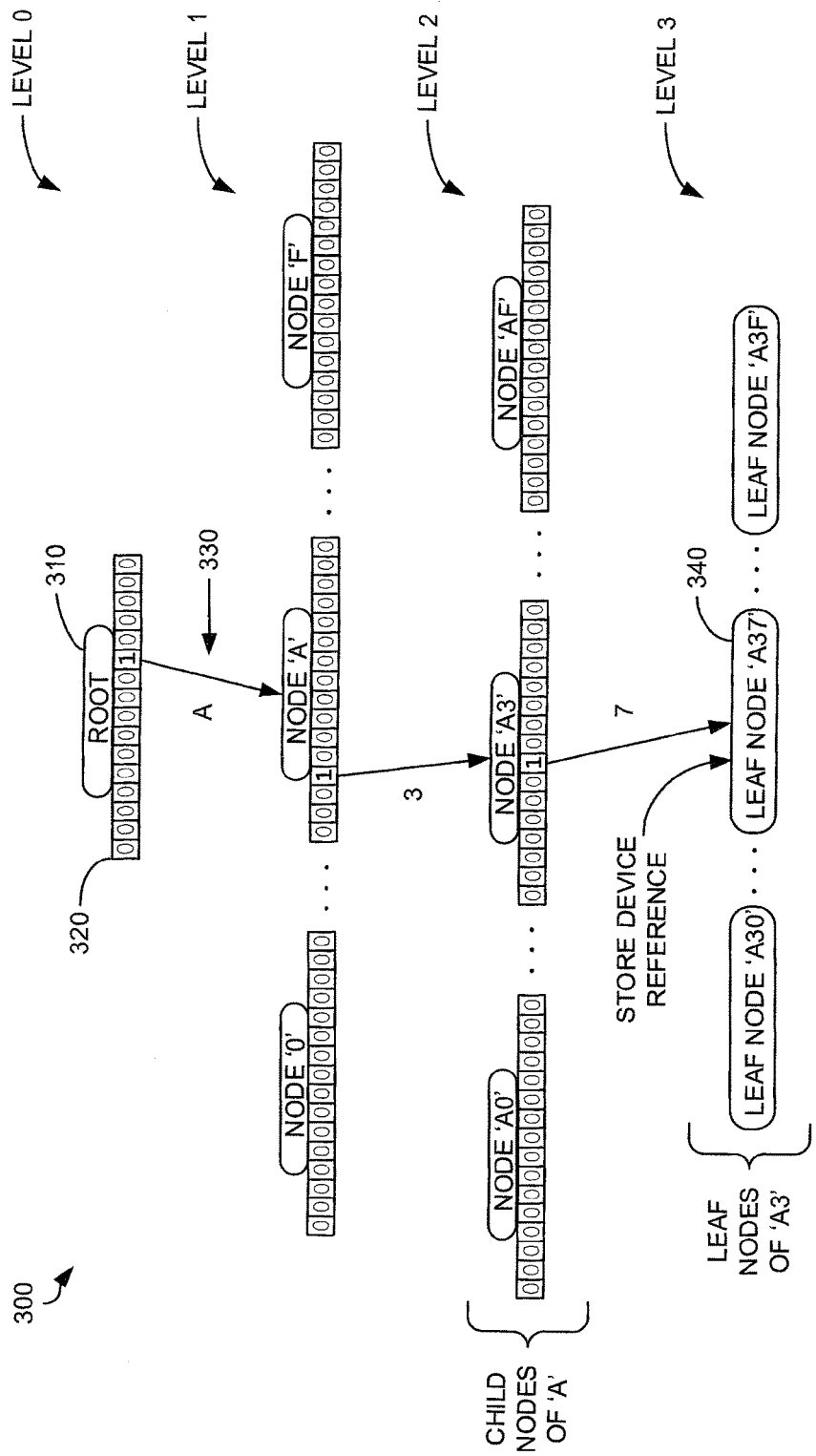
FIG. 3 illustrates inserting a Bloom filter in a Bloom filter index, in accordance with an embodiment of the invention.

For example, FIG. 3 illustrates inserting a 3-nibble Bloom filter representing a network device, with bit vector 101000110111=A37 (hex), in a Bloom filter index implemented as a B-tree 300, in accordance with an embodiment of the invention. The node size, or maximal number of child nodes, is 16, corresponding to the range of values 0-15 of a nibble. The child node indicators field 240 (see FIG. 2) of each non-leaf node 200, indicating which of its 16 available child nodes, or buckets, are populated, i.e., non-empty, may be implemented as a bit vector, or flag, of length 16, such that a 1 in bit location d signals that bucket d is non-empty, in which case the node will also include a pointer to node d on the next hierarchical level. To insert a Bloom filter with bit vector A37, if the bit corresponding to the nibble 'A' in flag 320 in root 310 on level 0 is 0, it is set to 1, a non-leaf child node 200 is allocated, 'A' is stored in its key field 220, and a pointer 330 to child node 'A' is stored in child node pointers field 230 of root 310. Next, child node 'A' is accessed via pointer 330. In node 'A' on level 1, if the bit corresponding to the second nibble '3' in its flag is 0, it is set to 1, a non-leaf node 200 is allocated, 'A3' is stored in its key field 220, and a pointer to a node 'A3' on level 2 is stored in its child node pointers field. Next, node 'A3' is accessed and, if the bit corresponding to the last nibble '7' in its flag is 0, it is set to 1, a leaf node 210 is allocated, 'A37' is stored in its key field 250, and a pointer to leaf node 'A37' 340 on level 3 is stored in its child node pointers field. Finally, leaf node 'A37' is accessed and a reference to the network device represented by the A37 Bloom filter is stored in network device references field 260. This process is repeated for each Bloom filter representing a network device to be inserted in the Bloom filter index.

Referring again to FIG. 1, Bloom filter utilities 116 may receive a request to identify network devices having a specified set of device traits, in accordance with an embodiment of the present invention. Bloom filter utilities 116 creates a target Bloom filter representing the device traits specified, searches the Bloom filter index in datastore 128, and returns a list of network devices whose traits match those of the target Bloom filter. Determining whether a target Bloom filter matches a particular Bloom filter corresponding to an indexed network device entails performing an AND operation between the target Bloom filter array and the device's Bloom filter array and, if the resulting array matches the target array, the indexed device is said to be a candidate. The search process is described in detail, with reference to FIGS. 4 and 5, below.

Unlike an index into an array, a single Bloom filter target may correspond to multiple candidates, including all Bloom filters with a 1 in each bit position where the target Bloom filter has a 1. For example, a Bloom filter representing a specific set of network device traits may correspond to a multitude of Bloom filters representing network devices that have these, and possibly other, traits. When performing a search in a Bloom filter index, a bit that is 1 in the target Bloom filter array may match a candidate Bloom filters that has a 1 in the same bit position, but each bit that is 0 in the target array may match a candidate with a 0 or a 1 in that position. For example, if matches for the bit pattern "10" are sought, then the first bit, 1, will match other 1 bits. However, the second bit, 0, will match both a 1 and a 0, and so leads to two possible matches, "11" and "10". This phenomenon is called solution space expansion. The 0's in a Bloom filter's bit vector determine how much of the key space, the set of all $2^i$ possible bit patterns for a bit vector of length m, a Bloom filter covers, i.e., the maximum number of possible candidates. This number can be estimated as follows. The number h of bits in a Bloom filter array that are 1 is called its Hamming value. The number c of 0's, which determines the solution space expansion, is given by c=m−h, where m is the number of bits in the Bloom filter array and h is its Hamming value. Thus, for any given Bloom filter, the maximum percentage of the key space that must be searched for a match is $2^c/2^m$. Allowing for solution space expansion distinguishes the present invention from current methods of indexing Bloom filters and, as described below, may provide a basis for deciding whether to search a Bloom filter index for a given Bloom filter or to simply perform a linear search.

TABLE 1

NIBBLE VALUES

| HEX | BINARY | MATCHES |
| --- | --- | --- |
| 0 | 0000 | 0, 1, 2, 3, 4, 5, 6, 7, 8, 9, A, B, C, D, E, F |
| 1 | 0001 | 1, 3, 5, 7, 9, B, D, F |
| 2 | 0010 | 2, 3, 6, 7, A, B, E, F |
| 3 | 0011 | 3, 7, B, F |
| 4 | 0100 | 4, 5, 6, 7, C, D, E, F |
| 5 | 0101 | 5, 7, D, F |
| 6 | 0110 | 6, 7, E, F |
| 7 | 0111 | 7, F |
| 8 | 1000 | 8, 9, A, B, C, D, E, F |
| 9 | 1001 | 9, B, D, F |
| A | 1010 | A, B, E, F |
| B | 1011 | B, F |
| C | 1100 | C, D, E, F |
| D | 1101 | D, F |
| E | 1110 | E, F |
| F | 1111 | F |

Figure 4:
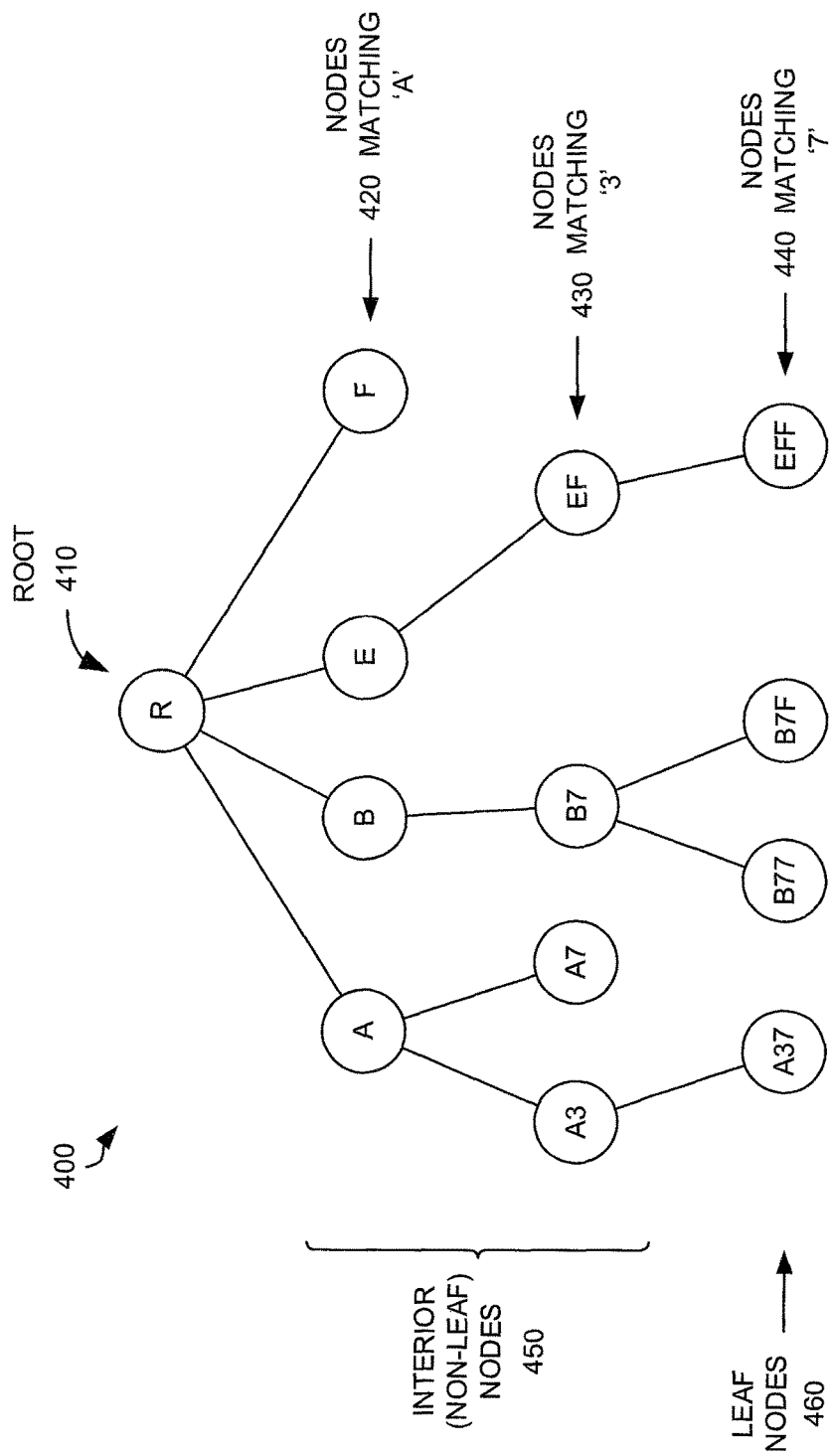
FIG. 4 is a graphical illustration of searching for a Bloom filter in a Bloom filter index, according to an embodiment of the invention.
Figure 5:
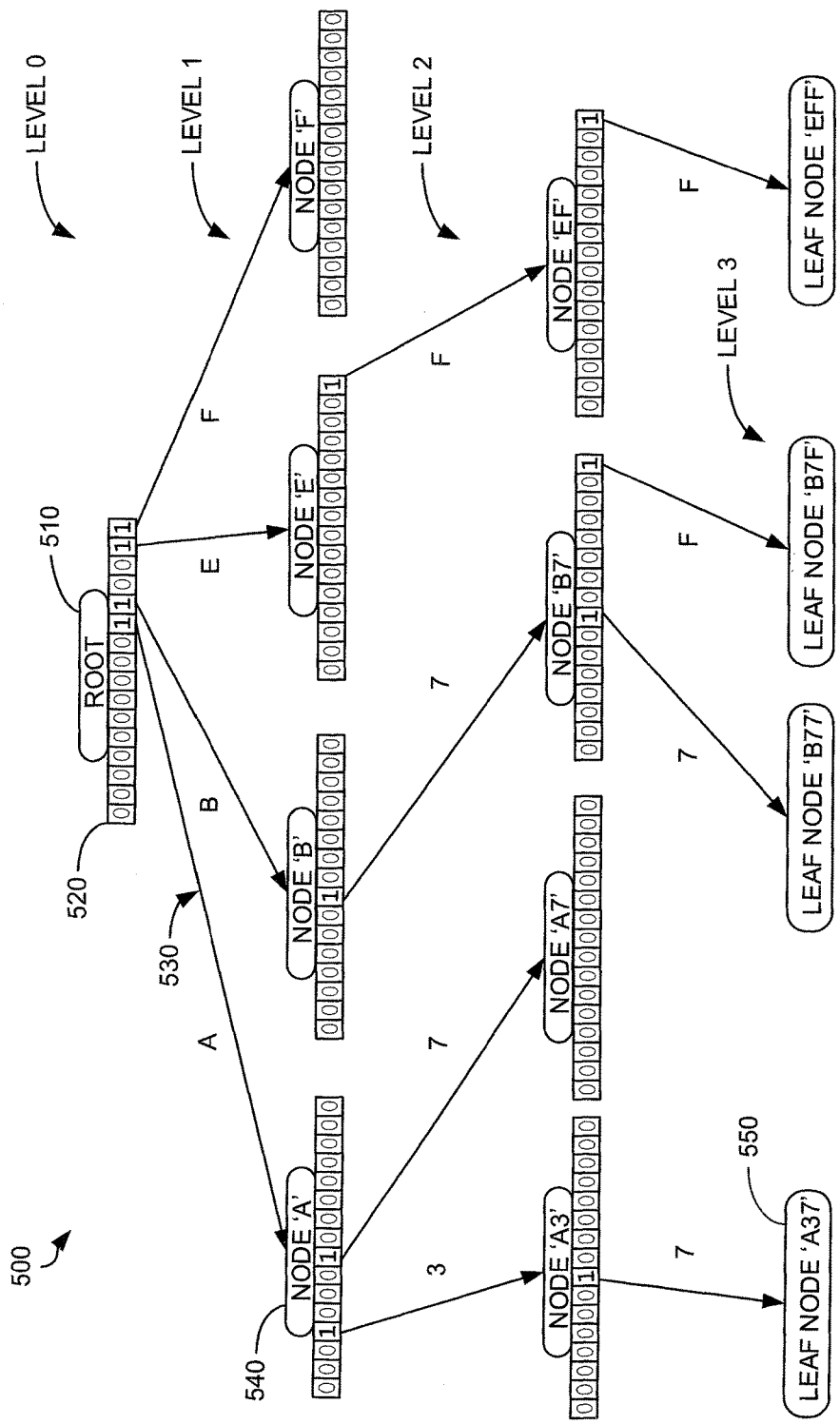
FIG. 5 is a detailed illustration of searching for a Bloom filter in a Bloom filter index, according to an embodiment of the invention.

Table 1 represents an aid in searching Bloom filter indexes implemented as B-trees, such as those depicted in FIG. 4 and FIG. 5, in which the keys correspond to the 16 possible nibble values 0-15, or 0-F (hex). As described above, for a given nibble $N_0$, the matching nibbles N are all those that have a 1 wherever $N_0$ has a 1; that is, those for which $N_0$ AND $N=N_0$. In general, a bit sequence $N_0$ is said to match another bit sequence N in the Bloom filter sense if $N_0$ AND $N=N_0$. In searching the B-tree, solution space expansion is accounted for by modifying the standard B-tree search such that on each non-leaf node 200 all child nodes corresponding to matching nibbles, as given by a lookup in Table 1, are searched. In those cases where a matching bucket is empty, it is ignored. However, each non-empty bucket represents a set of branches, corresponding to the matching nibbles, along which to search. As Table 1 shows, the maximal number of branches from each non-leaf node for each nibble is equal to $2^c$, where c is the number of zeros in the binary representation of the nibble.

FIG. 4 depicts searching for a Bloom filter via a graphical representation of a nibble-based B-tree 400, according to an embodiment of the invention. Matches for a Bloom filter with bit vector A37 (hex) are sought. B-tree 400 has root 410, interior nodes 450, and leaf nodes 460. Root 410 and interior nodes 450 represent non-leaf nodes 200, while leaf nodes 460 represent leaf nodes 210. FIG. 4 shows only those nodes that may be relevant in searching for A37. The search process is described in greater detail with reference to FIG. 5 below. Root node 410 is inspected and any child nodes 420 corresponding to nibbles that match 'A' according to Table 1 are identified. As shown, all matches A, B, E, and F correspond to child nodes of root 410. Next, for each node 420, child nodes 430 that match '3', according to Table 1, are identified. In this case, node 'A' 420 has child nodes 'A3' and 'A7' 430, node 'B' 420 has child node 'B7' 430, and node 'E' 420 has child node 'EF' 430. Node 'F' has no child nodes. Next, for each node 430 previously identified, child nodes 440 that match '7', according to Table 1, are identified. These are leaf nodes 460. In this case, node 'A3' 430 has child node 'A37' 440, node 'B7' 430 has child nodes 'B77' and 'B7F' 430, and node 'EF' 430 has child node 'EFF' 440. Thus, B-tree 400 has leaf nodes corresponding to bit vectors A37, B77, B7F, and EFF (hex), containing references to network devices that they represent.

FIG. 5 illustrates in more detail the search of FIG. 4 for a Bloom filter in a Bloom filter index implemented as a B-tree, for Bloom filters that match a target Bloom filter with bit index 101000110111=A37 (hex), according to an embodiment of the invention. A lookup in Table 1 for the first nibble 'A' in the target bit vector identifies A, B, E, and F as matching nibbles. Child node indicators field 240 of root 410, implemented as a bit vector, or flag, of length 16, indicates that the buckets corresponding to A, B, E, and F are non-empty, so these nodes on level 1 are examined next. In each of these nodes, the buckets 3, 7, B, and F, corresponding to nibbles matching the second nibble, '3', as indicated by Table 1, are checked to see if they are non-empty. That is, the corresponding bit in the flag that implements child node indicators field 240 is inspected. In the example of FIG. 5, node 'A' on level 1 has non-empty buckets corresponding to 3 and 7, node 'B' has a non-empty bucket corresponding to 7, and node 'E' has a non-empty bucket corresponding to F. Node 'F' has only empty buckets that correspond to 3, 7, B, and F. The last nibble, '7', matches 7 and F. Node 'A3' on level 2 has a non-empty bucket corresponding to 7; node 'B7' has non-empty buckets corresponding to 7 and F; and node 'EF' has a non-empty bucket corresponding to F. Node 'A7' has only empty buckets corresponding to 7 and F. Thus, leaf nodes 'A37', 'B77', 'B7F', and 'EFF' on level 3 contain references to Bloom filters that match the target Bloom filter, and these are returned as Bloom filter candidates. The maximal possible number of candidates is 32, but only four candidates were found. An implementation of the search process is illustrated in pseudo-code in Table 2.

256, one for each possible value of a byte (0 to 255), is constructed. The B-tree has a depth of b, one for each byte in a Bloom filter array. For example, if Bloom filters with bit vectors of length 72 are used, then b=9 bytes. Each device of N devices is inserted into the B-tree by constructing a Bloom filter corresponding to the values of the traits it possesses. For example, a device may be characterized by three traits. The Bloom filter's bit vector is decomposed into successive bytes, and the individual bytes are used to generate keys for the B-tree, as described above for nibbles. Using the first byte of the Bloom filter's bit vector, a corresponding bit in the root's flag is set to 1, indicating the presence of a child node corresponding to the value of the first byte; then the second byte identifies a node on the next hierarchical level of the B-tree, where a corresponding bit in the node's flag is set to 1; and so on, until the leaf node on the ninth level is reached. That leaf contains a list of references to network devices, to which the device being inserted is added.

In order to search the byte-based Bloom filter index for devices with specified traits, a target Bloom filter based on the desired traits is constructed and a method analogous to that described above with reference to FIGS. 4 and 5 for nibbles is employed. Of the three traits, devices may have one, two, or three desired traits. To search the B-tree, the first byte of the target Bloom filter's bit vector is read. Rather than locating a single bucket, as when inserting Bloom filters, all the non-empty buckets that match the first byte in the Bloom filter sense are identified. To determine byte matches, a lookup table with 256 lists, one for each byte value, analogous to Table 1, may be employed. Each node on the next level corresponding to a matching byte, for which the corresponding bit in the root's flag is 1, is similarly checked for a match. This process is repeated for the second byte and so on, until, with the last byte, a leaf node is reached. The network devices whose references are stored in the leaf nodes are aggregated and a list is returned.

It will be appreciated by persons skilled in the art that embodiments described herein generalize to network devices exhibiting more or fewer than three traits, Bloom filters of sizes other than 72, and B-trees indexed by portions of a Bloom filter bit vector other than bytes or nibbles, as

TABLE 2

| SEARCH PSEUDO-CODE | COMMENTS |
| --- | --- |
| findMatches( node, targetBitVector, nibbleIdx, resultList )<br>  for nibble in nibbleTable[ targetBitVector[nibbleIdx] ].matches do<br>    if nibbleIdx == targetBitVector.length then<br>      resultList.append( node.bucket[nibbleIdx] )<br>    else<br>      findMatches( node.bucket[nibbleIdx], targetBitVector,<br>            nibbleIdx+1, resultList )<br>    end if<br>  end for<br>end | targetBitVector is the target Bloom filter broken into nibbles; node is the B-tree node we are searching. nibbleTable is Table 1; nibbleIdx is the index of the nibble in targetBitVector. We are at the end and match. resultList is the list of matching Bloom filters. |

In an exemplary embodiment of the invention, a Bloom filter index based on bytes, rather than nibbles, is used for network discovery. The Bloom filter index is implemented as a B-tree, incorporating Bloom filters of size b bytes, representing network devices. A B-tree with a node size of presented herein. Moreover, alternative methods of indicating the presence of particular child nodes in the B-tree may be employed.

Due to solution space expansion, the searching method described above may yield multiple answers and may incur additional overhead as compared to the standard $\log_{256} N$ complexity for a standard B-tree search, for a B-tree with node size 256 with N elements. In some cases, searching the B-tree for a target Bloom filter will be less efficient than simply scanning a list of all the devices and performing the standard Bloom filter test on each device. In an embodiment of the invention, which search to use may be determined by applying an efficiency test before performing the B-tree search. The efficiency test may be based on solution space expansion, as described above. For example, suppose that the target Bloom filter has a Hamming value of h, the size of a Bloom filter is 72 bits, and the number of devices is N. If the inequality $$h > 72 - \log_2(N/\log_{256} N) \quad (2)$$

is true, then a B-tree search is performed. If (2) is false, then a linear search in the list of devices is done.

A more general efficiency test that may be employed to decide whether to perform a B-tree search is the inequality $$h > m - \log_2(N/\log_k N) \quad (3)$$

where h and N are as before, m is the number of bits in a Bloom filter array, and k is the maximum node size. If (3) is true, then a search in the Bloom filter index is performed. If (3) is false, then a linear search in the list of devices is done.

The strategy outlined above is based on the observation that when (3) is true, then, based on the maximal number of paths that may need to be searched, the B-tree search method is faster; otherwise, the linear search is faster. Overall, this strategy yields an improvement over linear search, as it will locate some devices faster than a linear search would. It is also an improvement over standard B-tree Bloom filter searches, as it does not perform the B-tree style search when the performance of that search would be inferior to that of a linear search.

Other efficiency tests are possible, for example, based on the expected number of nodes that may need to be searched rather than the maximal number of nodes.

Figure 6:
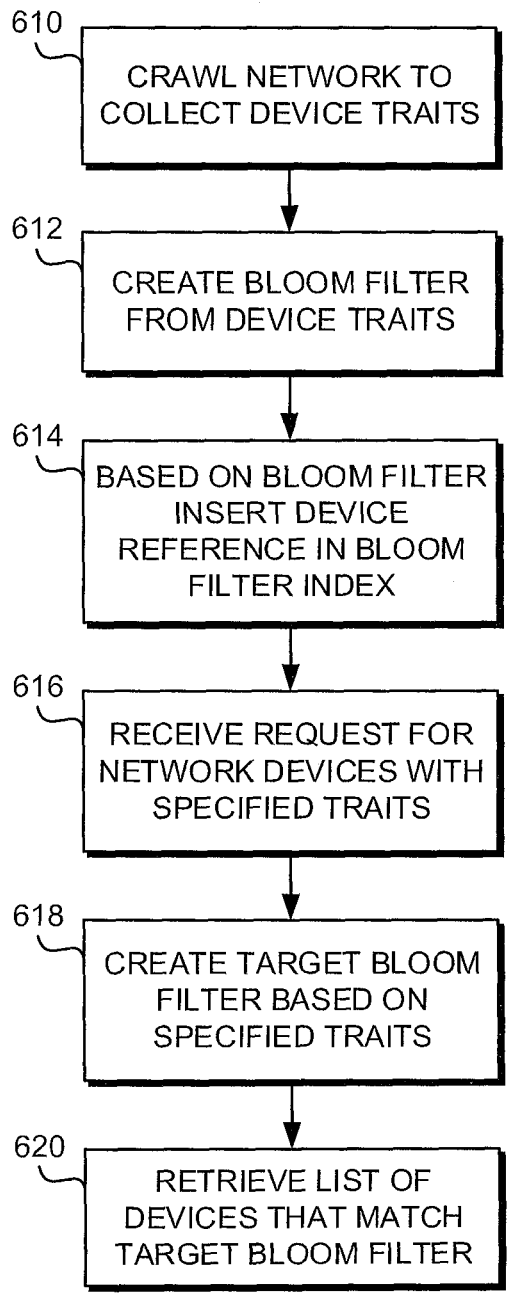
FIG. 6 is a flowchart depicting operational steps of a network discovery tool, in accordance with an embodiment of the present invention.

FIG. 6 is a flowchart depicting operational steps of network discovery tool 112, in accordance with an exemplary embodiment of the invention. Device information crawler 114 crawls network 130 to collect device traits of network devices (step 610). Bloom filter utilities 116 receives the device traits from device information crawler 114 and creates a Bloom filter for each network device, based on the device traits (step 612). Bloom filter utilities 116 inserts a reference to each network device in a Bloom filter index on datastore 128, based on the Bloom filters (step 614). Bloom filter utilities 116 may also receive a request to identify network devices having a specified set of traits (step 616). Bloom filter utilities 116 creates a target Bloom filter based on the specified traits (step 618). Bloom filter utilities 116 identifies network devices in the Bloom filter index that match the target Bloom filter and returns a list of the matching devices (step 620).

Figure 7:
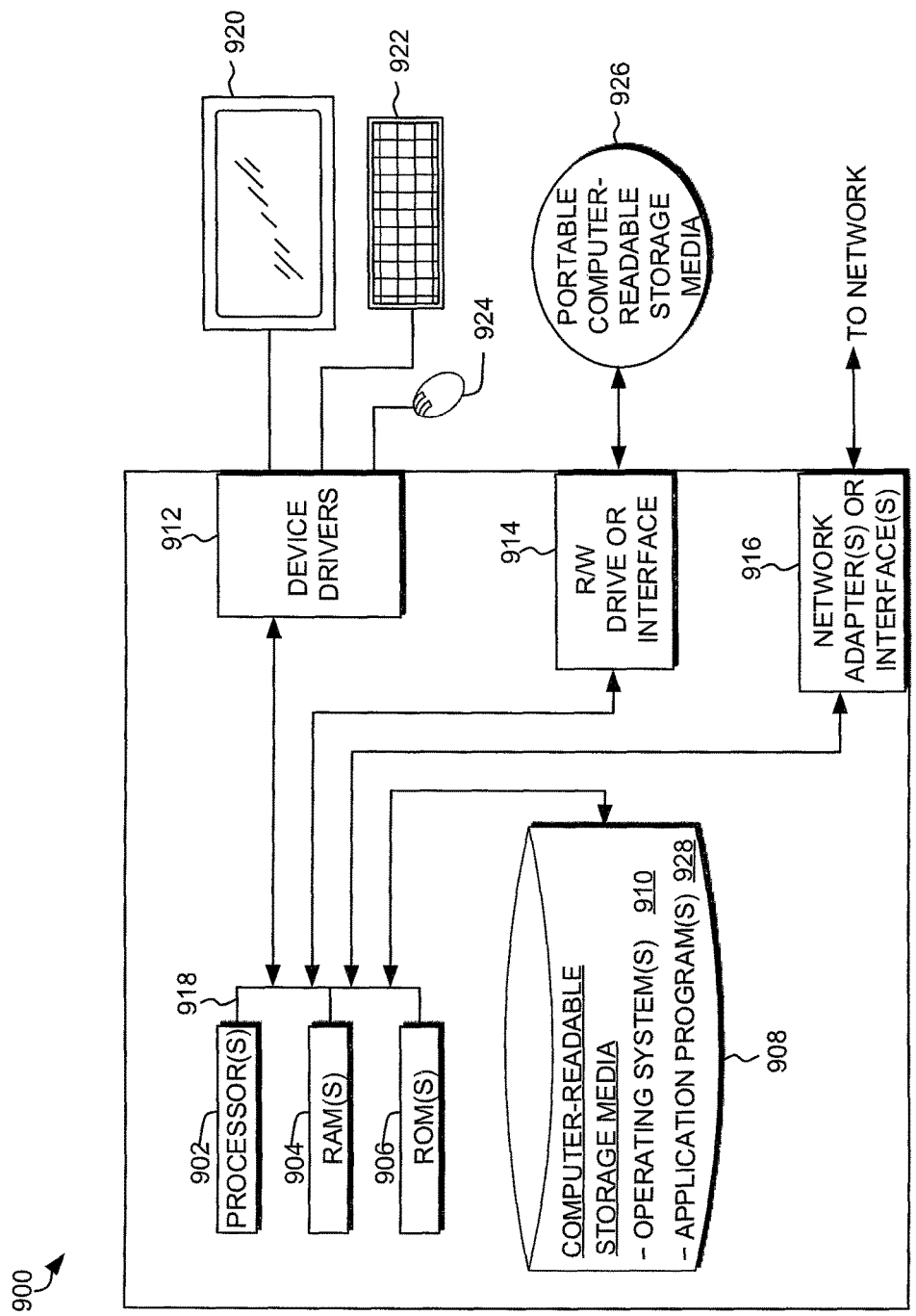
FIG. 7 is a functional block diagram illustrating a data processing environment, in accordance with an embodiment of the present invention.

FIG. 7 depicts a block diagram 900 of components of computing device 110 (FIG. 1), in accordance with an embodiment of the present invention. It should be appreciated that FIG. 7 provides only an illustration of one implementation and does not imply any limitations with regard to the environments in which different embodiments may be implemented. Many modifications to the depicted environment may be made.

Computing device 110 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, network discovery tool 112 (FIG. 1), are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing device 110 may also include a R/W drive or interface 914 to read from and write to one or more portable computer readable storage media 926. Application programs 928 on client computing devices and/or computing device 110 may be stored on one or more of the portable computer readable storage media 926, read via the respective R/W drive or interface 914 and loaded into the respective computer readable storage media 908.

Computing device 110 may also include a network adapter or interface 916, such as a TCP/IP adapter card or wireless communication adapter (such as a 4G wireless communication adapter using OFDMA technology). Application programs 928 on computing device 110 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Computing device 110 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
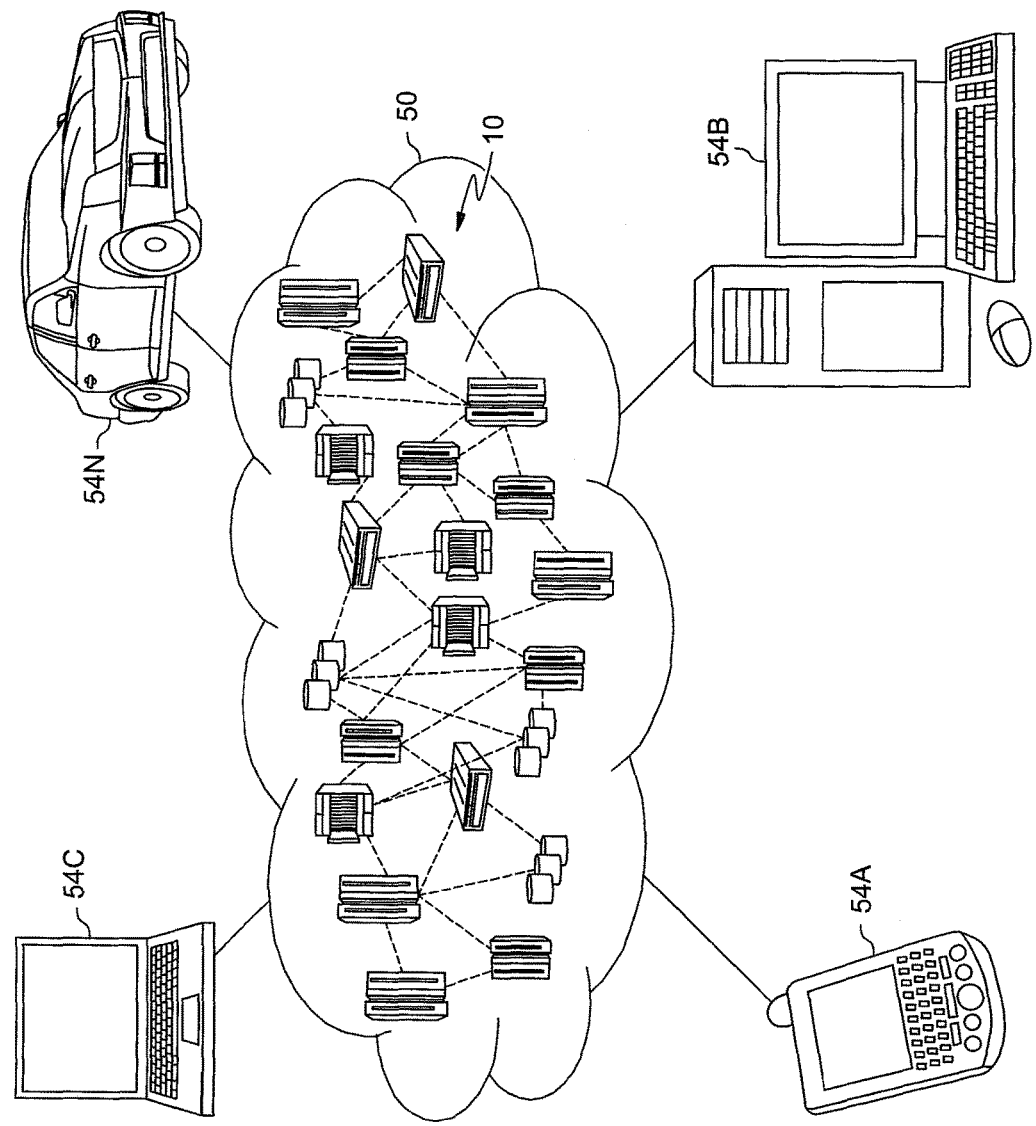
FIG. 8 depicts a cloud computing environment according to an embodiment of the present invention.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and network discovery tool 96.

The foregoing description of various embodiments of the present invention has been presented for purposes of illustration and description. It is not intended to be exhaustive nor to limit the invention to the precise form disclosed. Many modifications and variations are possible. Such modification and variations that may be apparent to a person skilled in the art of the invention are intended to be included within the scope of the invention as defined by the accompanying claims.

What is claimed is:

1. A computer program product for identifying network devices having specified traits using a multi-level hierarchical data structure, the compute program product comprising:
    receiving a plurality of Bloom filters representing a plurality of corresponding network devices, wherein each Bloom filter includes a bit vector with a number b of 8-bit bytes, the bit vector representing a plurality of traits of the corresponding network device;
    for each received Bloom filter:
        decomposing the bit vector into b successive bytes, wherein each successive byte corresponds to a successive level of a hierarchical data structure below level 0;
        allocating memory on level 0 of the hierarchical data structure, the memory including a pointer storage for storing a pointer to a memory location on level 1 of the hierarchical data structure, unless such memory is already allocated based on a previously processed Bloom filter;
        assigning a label to the pointer storage, based on a value of the first byte;
        for each successive byte, except for the last byte:
            allocating memory on the level corresponding to the successive byte, the memory including a pointer storage for storing a pointer to a memory location on the next successive level, unless such memory is already allocated based on a previously processed Bloom filter;
            assigning a label to the pointer storage, based on a value of the next successive byte;
            storing, in the pointer storage on the previous level that was assigned a label based on the value of the successive byte, a pointer to the allocated memory, unless such a pointer has already been stored based on a previously processed Bloom filter; and
        for the last byte:
            allocating memory on the last level of the hierarchical data structure, the memory including a data storage for storing a reference to the network device, unless such memory is already allocated based on a previously processed Bloom filter;
            storing in the pointer storage on the second-to-last level that was assigned a label based on the value of the last byte, a pointer to the allocated memory, unless such a pointer has already been stored based on a previously processed Bloom filter; and
            storing, a reference to the network device in the data storage on the last level of the hierarchical data structure;
    receiving a search Bloom filter, wherein the search Bloom filter includes a bit vector with b bytes, the bit vector representing specified traits of a network device;
    decomposing the search Bloom filter's bit vector into b successive bytes, wherein each successive byte corresponds to a successive level of a hierarchical data structure below level 0; and
    identifying references to network devices stored in the hierarchical data structure and related to the search Bloom filter by:
        for each successive byte:
            identifying any memory locations on the level corresponding to the successive byte, that are referenced by pointers stored on the previous level, whose assigned labels are based on the value of a byte having a 1 bit wherever the successive byte has a 1 bit; and
        for the last byte:
            identifying references to network devices data stored in the identified memory locations on the last level of the hierarchical data structure,
            wherein network devices that are referenced correspond to the traits specified in the search Bloom filter.

* * * * *